United States Patent
Karlsen et al.

(10) Patent No.: US 7,372,628 B2
(45) Date of Patent: May 13, 2008

(54) DISPLAY SCREEN

(75) Inventors: Tor Martin Karlsen, Saltnes (NO); Viggo Ersøybakk, Fredrikstad (NO)

(73) Assignee: InFocus Corporation, Wilsonville, OR (US)

( * ) Notice: Subject to any disclaimer, the term of this patent is extended or adjusted under 35 U.S.C. 154(b) by 205 days.

(21) Appl. No.: 11/146,438

(22) Filed: Jun. 6, 2005

(65) Prior Publication Data

US 2006/0193042 A1    Aug. 31, 2006

Related U.S. Application Data

(60) Provisional application No. 60/657,290, filed on Feb. 28, 2005.

(51) Int. Cl.
*G03B 21/56* (2006.01)
*G03B 21/60* (2006.01)

(52) U.S. Cl. .................. 359/443; 359/454; 359/459

(58) Field of Classification Search ............ 359/443, 359/448–449, 454–455, 459–460
See application file for complete search history.

(56) References Cited

U.S. PATENT DOCUMENTS

| | | | | |
|---|---|---|---|---|
| 5,175,637 A | * | 12/1992 | Jones et al. | 349/1 |
| 7,068,427 B2 | * | 6/2006 | Hopkins et al. | 359/443 |
| 2003/0174396 A1 | * | 9/2003 | Murayama et al. | 359/453 |
| 2005/0063054 A1 | * | 3/2005 | Umeya | 359/443 |

* cited by examiner

*Primary Examiner*—Diane I. Lee
*Assistant Examiner*—Magda Cruz
(74) *Attorney, Agent, or Firm*—Alleman Hall McCoy Russell & Tuttle LLP

(57) ABSTRACT

A display screen for a projection device is disclosed, wherein the display screen includes a substantially rigid translucent backing structure, and a viewing surface disposed on the backing structure, wherein the viewing surface has a frosted appearance. The display screen also may include a contrast-improving intermediate layer disposed between the backing structure and the viewing surface.

14 Claims, 2 Drawing Sheets

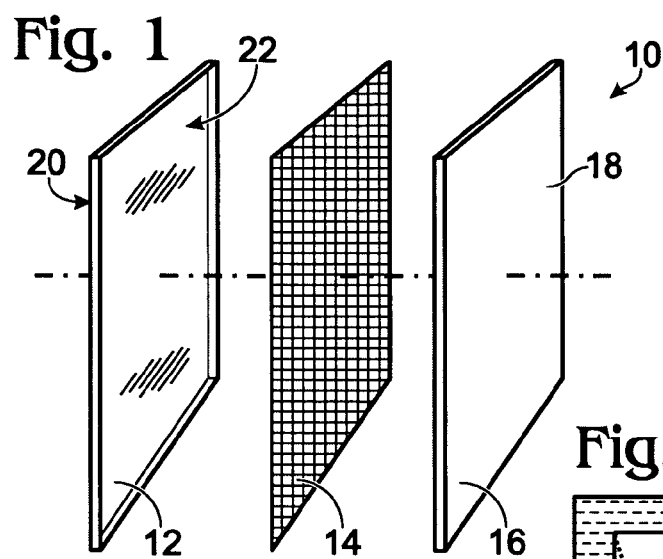
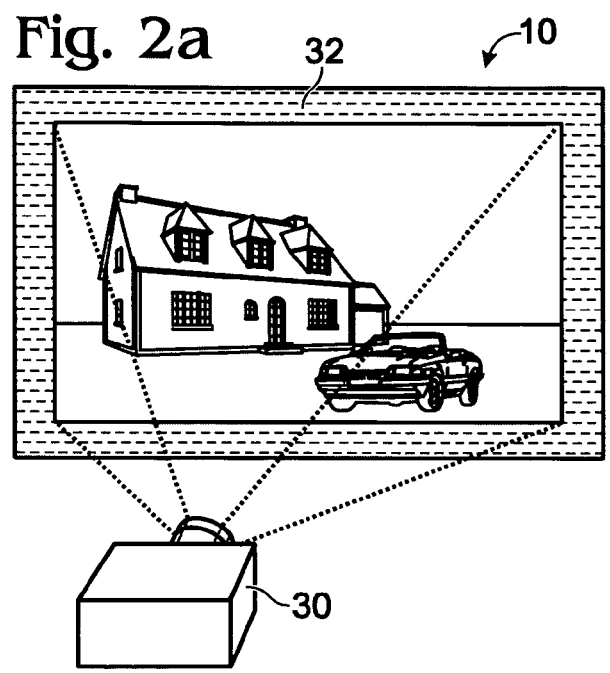
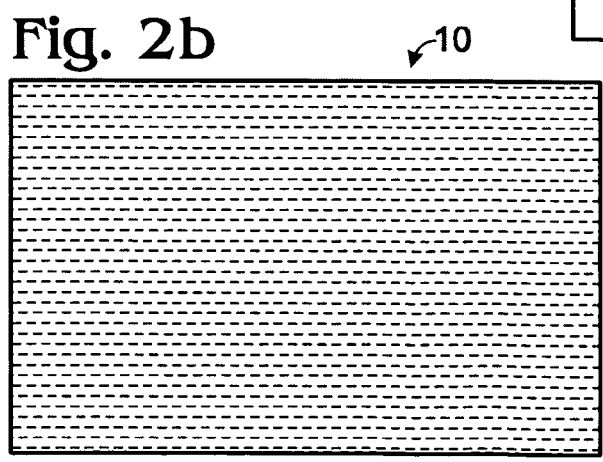
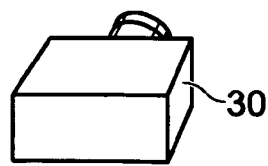
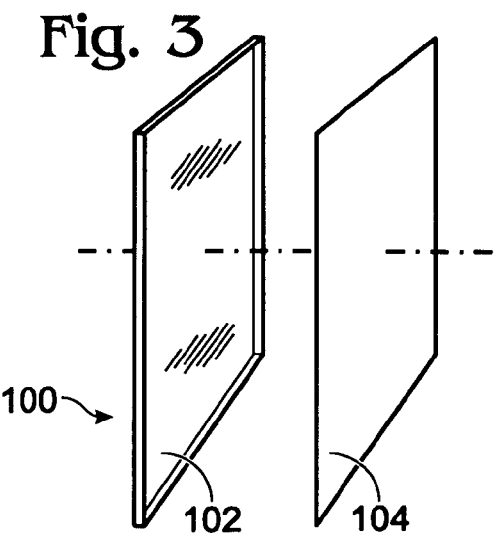

ically rectangular shape, it will be appreciated that border 32 alternatively may have any other suitable shape.

DISPLAY SCREEN

CROSS-REFERENCE TO RELATED APPLICATION

The present application claims priority to U.S. Provisional Patent Application Ser. No. 60/657,290 of Tor Martin Karlsen, entitled DISPLAY SCREEN and filed Feb. 28, 2005, the disclosure of which is hereby incorporated by reference.

TECHNICAL FIELD

The present disclosure relates generally to a display screen, and more specifically to a display screen for displaying images projected by a projection device.

SUMMARY

One embodiment provides a display screen for a projection device, wherein the display screen includes a substantially rigid translucent backing structure, and a viewing surface disposed on the backing structure, wherein the viewing surface has a frosted appearance.

Another embodiment provides a display screen for a projection device, wherein the display screen includes a substrate, an intermediate layer disposed on the substrate, wherein the intermediate layer includes a contrast-improving feature, and a viewing surface layer disposed on the intermediate layer, wherein the viewing surface layer has a frosted appearance.

Yet another embodiment provides a display screen for a projection device, wherein the display screen includes a generally rigid, translucent backing structure, a contrast-improving intermediate layer adhered to the backing structure, wherein the intermediate layer is configured to improve a contrast of an image projected onto the screen in a presence of ambient light, and a viewing surface layer adhered to the intermediate layer, wherein the viewing surface layer is formed from one of a transparent and a translucent material, and wherein viewing surface layer includes a viewing surface textured such that the viewing surface has a frosted appearance. BRIEF DESCRIPTION OF THE DRAWINGS The disclosure is illustrated by way of example and not by way of limitation in the figures of the accompanying drawings, in which the like references indicate similar elements and in which:

FIG. 1 is an exploded view of an exemplary display screen according to an embodiment of the present disclosure.

FIG. 2a is a plan view of the embodiment of FIG. 1, with an image displayed thereon.

FIG. 2b is a plan view of the embodiment of FIG. 1, with no image displayed thereon.

FIG. 3 is an exploded view of another embodiment of a display screen according to the present disclosure.

DETAILED DESCRIPTION OF DEPICTED EMBODIMENTS

Figure 4A:
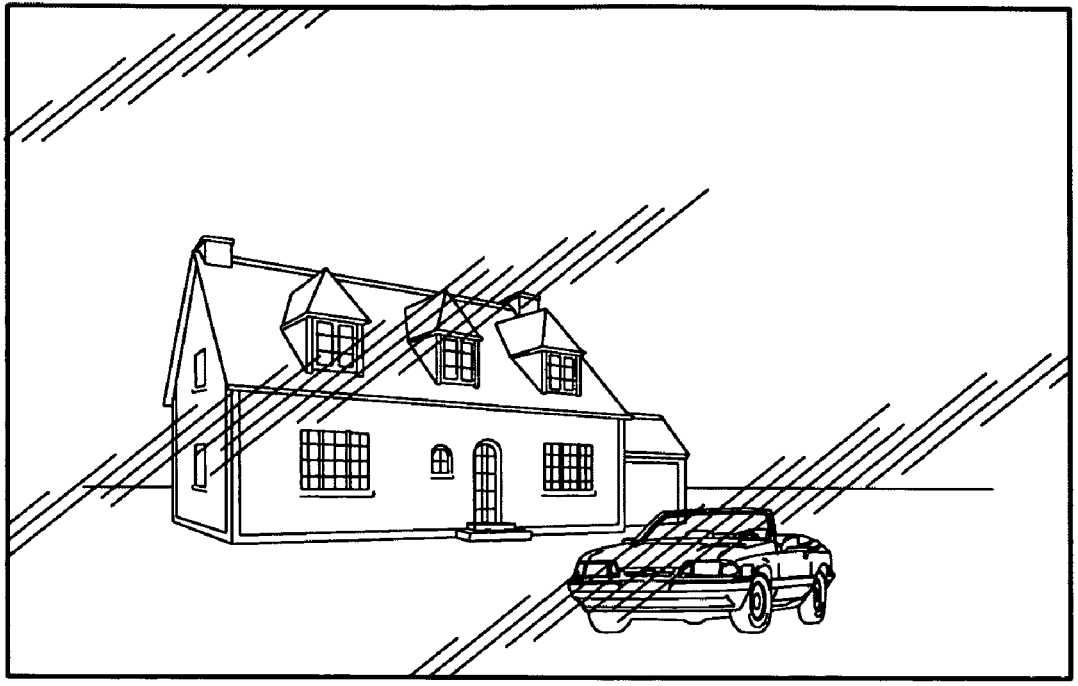
FIG. 4a is a view of a prior art screen having an image displayed thereon in the presence of ambient light.

One exemplary embodiment of a display screen according to the present disclosure is illustrated generally at 10 in FIG. 1. Display screen 10 includes a backing structure 12, an intermediate layer 14 and a front layer 16. Intermediate layer 14 may include properties configured to enhance or improve contrast in an image displayed on screen 10, and therefore also may be referred to as contrast-improving layer 14. Front layer 16 may include a viewing surface 18 onto which an image from a front projection system is projected, and therefore also may be referred to as viewing surface layer 16. It will be appreciated that front layer 16 and/or backing structure 12 may also include contrast-improving features in addition to intermediate layer 14.

Screen 10 may be configured to be wall-mounted, ceiling mounted, or otherwise mounted or secured to a frame or other surface or structure. For example, in some embodiments, the screen may be mounted on a tripod, a stand, on a wall or other vertical surface, within or to a frame, etc. Furthermore, screen 10 may be adapted to be storable, such as through a rolling mechanism, or storable in a flat configuration in a casing, etc. In yet other embodiments, screen 10 may be configured to be foldable or collapsible.

It should be appreciated that screen 10 may be used with any suitable projection device, such as the projector shown at 30 in FIGS. 2a and 2b. Although shown for use with a front projector, it will be appreciated that screen 10 alternatively may be adapted for use as a rear projection screen.

Backing structure 12 is configured to provide support to intermediate layer 14 and front layer 16. For example, in one embodiment, backing structure 12 may be formed from a sheet of glass, a clear sheet of a polymer material (such as polycarbonate, polystyrene, or any other suitable polymer), or other generally rigid transparent or translucent material. In alternate embodiments, backing structure is formed from a suitable non-transparent or non-translucent material. In other embodiments, backing structure 12 may be flexible or collapsible to facilitate storage, transportation, and/or selective sizing of screen 10 for a desired image size.

Backing structure 12 may also be configured to provide screen 10 with a modern, aesthetically pleasing design. For example, prior screens (such as roll-up flexible white display screens) typically have the appearance of a sheet of fabric or coated fabric. Such screens may be unsightly in a user's living space, even if mounted within a decorative frame or cabinet. In contrast, the use of a glass or other decorative backing structure 12 may provide a sophisticated, modern appearance. The appearance of backing structure 12 may be further improved by providing beveled, curved or other shaped edges on backing structure 12, by modifying the perimeter shape of backing structure 12, or by adding other decorative features to backing structure 12.

In some embodiments, a perimeter region of the front face of backing structure 12 may also be configured to provide a frame or border for an image displayed on screen 10. In these embodiments, the area of backing structure 12 may be larger than the area of an image displayed on screen 10, thereby leaving a border around the image, as shown at 32 in FIG. 2a. Alternatively, the entire area of backing structure 12 may be used for image display. Where backing structure 12 has a larger area than the area of screen 10 intended to be used for image display, decorative features may be provided in the border area of backing structure 12 to further enhance the artistic or decorative appearance of screen 10. Furthermore, while the border 32 in FIG. 2a has an approximately equal width on each side of the image, it will be appreciated that the border may also be designed to have different widths at different points around its circumference, depending upon the shape of screen 10 and the size and placement of the image on the screen, to achieve a desired design effect.

Mounting features (not shown) may be coupled to a back surface 20 of backing structure 12 for mounting screen 10 to or within a wall, stand, cabinet, or other vertical surface or mounting structure. In these environments, the appearance of a glass (or other rigid, transparent or translucent) backing structure may have an attractive, artistic and/or decorative appearance that complements the appearance of a room, even when not in use. In some embodiments, a casing or cabinet may be provided to hide the display screen during non-use.

Intermediate layer 14 and front layer 16 include features that cooperate to provide for the clear, high-gain, high-contrast appearance of an image projected onto viewing surface 18. First, front layer 16 may be configured to have a frosted appearance. As used herein, the term "frosted appearance" refers to an appearance similar to that of etched glass or of glass covered in a layer of frost. Likewise, the term "frosted appearance" may refer to the appearance of decorative polymer or glass sheets that can be applied to an underlying sheet of glass or other material to give the material an etched or frosted appearance. Examples of such decorative polymer sheets include, but are not limited to, decorative sheets sold by the 3M Company under the trade name SCOTCHCAL ELECTROCUT graphic film, including but not limited to series 7725SE of the same, and other similar films. It has been found that images projected on such a surface have a sharp, bright appearance.

Furthermore, the features that enhance performance also help improve the aesthetic appeal of screen 10. For example, the frosted appearance of front layer 16 may match or complement the appearances of other pieces of furniture, glass art, etc. found in a room.

Instead of utilizing a polymer sheet as front layer 16, screen 10 may alternatively utilize an etched glass front layer 16. Furthermore, in some embodiments, the textured surface of front layer 16 that gives front layer 16 the etched appearance may face outwardly toward a viewer, while in other embodiments the textured surface may be adhered to or otherwise attached to intermediate layer 14.

In yet other embodiments, front layer 16 may be attached directly to backing structure 12. In these embodiments, intermediate layer 14 may be omitted. Furthermore, in still other embodiments, a surface of backing structure 12 may be etched, and the image displayed directly on backing structure 12. In these embodiments, both intermediate layer 14 and front layer 16 may be omitted. In yet other embodiments, a coating may be applied to front layer 16 to give front layer 16 a frosted appearance.

In some embodiments, front layer 16 may be at least partially transparent or translucent. Furthermore, front layer 16 may be at least partially diffusive, or may include structures which may be configured to diffuse or reflect ambient light differently than the projected light. It should be appreciated that in some embodiments, the entire surface of backing structure 12 may be prepared with or covered with front layer 16. In other embodiments, only select sub-portions of backing structure 12 may be prepared or covered with front layer 16. For example, in some embodiments, the perimeter of the front surface 22 of backing structure 12 may be prepared or covered with a frosted front layer 16, while the center of front surface 22 of backing structure 12 may have another appearance. Likewise, in other embodiments, a center portion of backing structure 12 may be prepared with or covered with front layer 16 to have a frosted appearance, and a perimeter portion of backing structure 12 may be unprepared or uncovered.

Intermediate layer 14 may include structures or features configured to enhance a contrast of an image displayed on screen 10. For example, in some embodiments, intermediate layer 14 has an opaque or substantially opaque appearance, and may be configured to absorb a substantial quantity of light incident on intermediate layer 14. In other embodiments, intermediate layer 14 has a shaded or black appearance. The use of an intermediate layer 14 with a shaded, black and/or opaque appearance may help to absorb back-scattered light from front layer 16, and/or may help to absorb ambient light. Therefore, projected light reflected by front layer 16 may have a greater contrast relative to intermediate layer 14.

Any suitable material may be used as intermediate layer 14. For example, in some embodiments, intermediate layer 14 may be formed from a pigmented or otherwise colored or shaded polymer film. In one specific embodiment, intermediate layer 14 is formed from a black celluloid photographic film layer. Alternatively, intermediate layer 14 may be formed from any other suitable black or shaded material, or other material that produces or reflects comparatively little light. In some embodiments, intermediate layer 16 may further be substantially non-reflective. It should be appreciated that intermediate layer 16 may include additional coatings, surface treatments, layers, coverings, sheets, etc. not shown herein. Further, in some embodiments, intermediate layer 16 may be formed from a material that changes appearance under changing environmental conditions such that the film is adaptive to the surrounding ambient light conditions. For example, the film may be formed from or include a thermochromic material, electrochromic material, or other such material.

Intermediate layer 14 may be configured to cover only a portion of the front surface of backing structure 12, or may be configured to cover the entire front surface of backing structure 12. Furthermore, the relative sizes of intermediate layer 14, front layer 16 and the image projected onto screen 10 may be varied to produce a desired image appearance and interesting framing effects around the image. FIGS. 2a and 2b illustrate this framing effect. As depicted in FIG. 1, intermediate layer 14 and front layer 16 each cover the entire front surface area of backing structure 12. However, as depicted in FIG. 2a, the image projected onto screen 10 by projection device 30 does not cover the entire surface of front layer 16. The portion of front layer 16 that is covered by the projected image has a bright appearance due to light reflected from the "frosted" surface of front layer 16. However, the perimeter of the screen, indicated at 32, has a much darker appearance due to the shaded or black appearance of intermediate layer 14 as viewed through the translucent or transparent front layer 16.

On the other hand, when the projector 30 is turned off, the entire area of screen 10 has the same darker appearance that was limited to the perimeter of screen 10 during projection. Furthermore, the combination of the frosted appearance of front layer 16, the dark, shaded or opaque appearance of intermediate layer 14, and the clean, modern appearance of backing structure 12 gives the overall screen an appealing look that complements the appearance of a room even when screen 10 is not in use. It will be appreciated that the appearance of screen 10 may be tailored by varying, for example, (1) the thickness, texture, transparency, etc. of front layer 16, (2) the thickness, shape, transparency, shade, tint, color, etc. of intermediate layer 14, and (3) and/or the thickness, shape, edge profile, color, tint, transparency, etc. of backing structure 12 to appeal to the potentially different aesthetic tastes of many users.

The combination of backing structure 12, intermediate layer 14 and front layer 16 may generate a high gain, high contrast screen with an attractive and aesthetically pleasing appearance. Such a layered screen 10 also may have a high ambient light tolerance in comparison to other types of screens. Although a three-layer screen 10 is shown and described, it should be appreciated that there may be additional front layers or coatings, additional intermediate layers, etc. Furthermore, in some embodiments, intermediate layer 14 and backing structure 12 may be integrated into a single layer. Alternatively, in some embodiments, intermediate layer 14 and front layer 16 may be integrated into a single layer.

FIG. 3 shows, generally at 100, an alternate exemplary embodiment of a display screen according to the present disclosure. Display screen 100 includes a backing structure 102 and a front layer 104, but no intermediate layer. Backing structure 102 may have either a transparent appearance, or a partially or fully opaque and/or shaded appearance that absorbs ambient and/or backscattered light. Likewise, front layer 104 may have a frosted appearance, and may be at least partially transparent or translucent, thereby providing a pleasing and modern appearance to display screen 100. In this embodiment, either backing structure 102 and/or front layer 104 may include contrast-improving features. The use of the three-layer structure shown in FIG. 1 or the two-layer structure shown in FIG. 3 may depend upon the properties of the material used as front layer 16. The properties of front layer 16 that may influence this choice may include, but are not limited to, the pattern and the relative transparency/translucency of front layer 16.

Figure 4B:
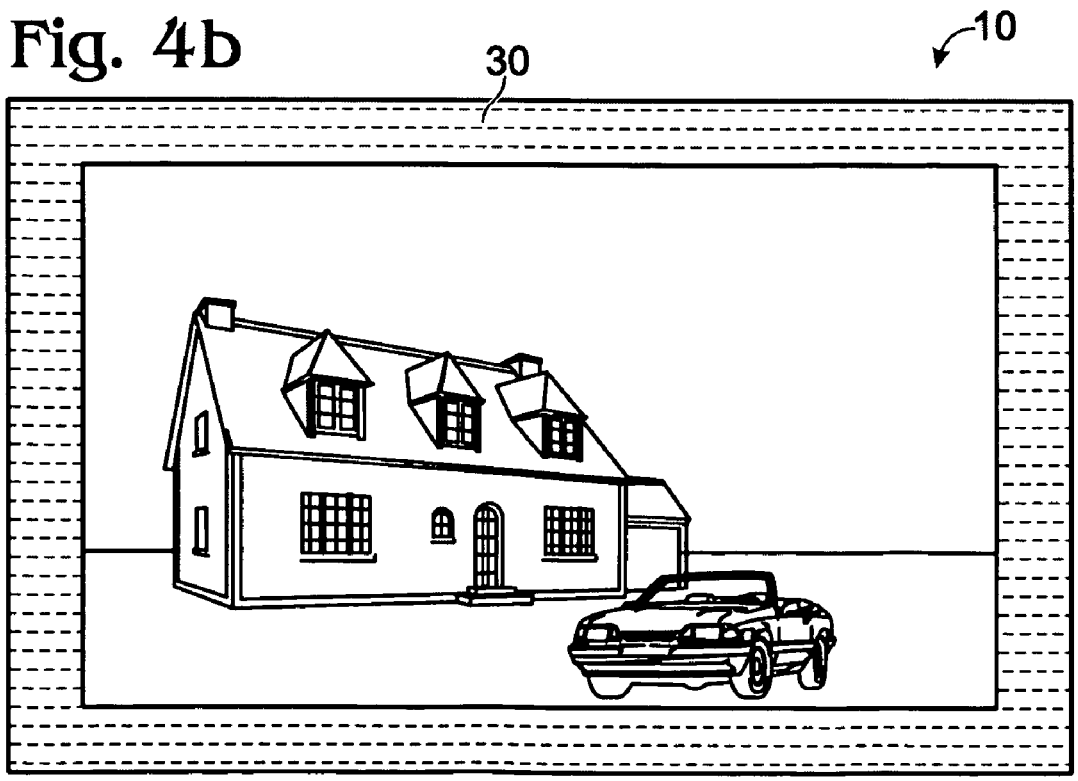
FIG. 4b is a view of a screen according to an embodiment of the present disclosure having an image displayed thereon in the presence of ambient light.

The above disclosed display screens may provide enhanced image display. FIGS. 4a and 4b illustrate the differences between a conventional, prior white screen and display screen 10 (or display screen 100). Specifically, FIG. 4a depicts an image displayed on a conventional white screen, and FIG. 4b depicts an image on display screen 10 in a room with an ordinary amount of ambient light (such as daytime light inside a room with uncovered windows or similar light conditions). As shown, the white screen has little or no contrast such that the image is washed out in the ambient daytime light. In contrast, the layered display screen has a highly-contrasted image which is visible in the ambient daytime light. The layered display screen therefore provides an improved display image under ordinary ambient light conditions compared to conventional white screen systems, which typically required a user to decrease the ambient room light as much as possible in order to obtain an image with adequate contrast for user viewing.

The disclosed screens likewise may be useful in a variety of environments. For example, the screen may be used in classroom settings where it is difficult to remove the ambient room light. Further, such screens may be useful in home environments where windows and various light sources may prevent a user from decreasing all the light in the room. Such improved image quality in the presence of daytime and dimmed light may enable a user to use such display screens as televisions, computer monitors, gaming monitors, or signage. Similarly, such screens may be useful in business environments, lecture halls, public facilities, etc., where ambient room light may be present during image display.

The above-described layered display screens may be easy and inexpensive to manufacture. For example, backing structure 12 may be formed from a glass plate, and intermediate layer 14 and front layer 16 may be applied as pre-formed sheets via adhesives or any other suitable methods. Alternatively, layers 14 and 16 may be applied using any other suitable methods, including but not limited to evaporation/condensation, sputtering, chemical vapor deposition, spray-coating, dipping, magnetic techniques, etc. Further, the materials used in assembling the disclosed display screen may be relatively inexpensive, thereby decreasing costs to a user. In the specific embodiment of a glass backing structure, an intermediate layer formed from black photographic (e.g. celluloid) film and a front layer formed from a transparent frosted vinyl film, all of the required materials are commercially available at low cost. Thus, the combination of simplicity in manufacturing and in materials may enable production of a high quality image screen at a relatively low cost.

While the embodiments described herein include a viewing surface having a frosted appearance, it will be appreciated that the concepts disclosed herein may be extended to viewing surfaces having other appearances. For example, a front layer having an appearance of a wooden, iron (or other metallic), or other such textured surface may be selected to give the screen a desired artistic and/or decorative appearance in a room.

Furthermore, although the present disclosure includes specific embodiments, specific embodiments are not to be considered in a limiting sense, because numerous variations are possible. The foregoing embodiments are illustrative, and no single feature, component, or action is essential to all possible combinations that may be claimed in this or later applications. The subject matter of the present disclosure includes all novel and nonobvious combinations and subcombinations of the various elements, features, functions, and/or properties disclosed herein. The following claims particularly point out certain combinations and subcombinations regarded as novel and nonobvious. These claims may refer to "a" or "a first" element or the equivalent thereof. Such claims should be understood to include incorporation of one or more such elements, neither requiring nor excluding two or more such elements. Further, ordinal numbers, such as first, second, and third, for identified elements or actions are used to distinguish between the elements and actions, and do not indicate a required or limited number of such elements or actions, nor a particular position or order of such elements or actions unless otherwise specifically stated. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A front-projection display screen for a front-projection device, comprising:
   a generally rigid, translucent backing structure:
   a contrast-improving intermediate layer adhered to the backing structure, wherein the intermediate layer includes a black celluloid photographic film layer and is configured to improve a contrast of an image projected onto the screen in a presence of ambient light; and
   a viewing surface layer adhered to the intermediate layer, wherein the viewing surface layer is formed from one of a transparent and a translucent material, and wherein the viewing surface layer includes a viewing surface textured such that the viewing surface has a frosted appearance capable of reflecting projected light for front-projection viewing.

2. The display screen of claim 1, wherein the intermediate layer has a shaded appearance.

3. The display screen of claim 1, wherein the intermediate layer has a generally black appearance.

4. The display screen of claim 1, wherein the backing structure includes a sheet of glass.

5. The display screen of claim 1, wherein the backing structure is transparent.

6. The display screen of claim 1, wherein the viewing surface layer only partially covers the backing layer.

7. The display screen of claim 1, wherein the viewing surface layer fully covers the backing layer.

8. A front-projection display screen for a front-projection device, comprising:
   a generally rigid, translucent backing structure;
   a contrast-improving intermediate layer adhered to the backing structure, wherein the intermediate layer includes a thermochromatic material that changes appearance under changing environmental conditions and is configured to improve a contrast of an image projected onto the screen in a presence of ambient light; and
   a viewing surface layer adhered to the intermediate layer, wherein the viewing surface lever is formed from one of a transparent and a translucent material, and wherein the viewing surface layer includes a viewing surface textured such that the viewing surface has a frosted appearance capable of reflecting projected light for front-projection viewing.

9. The display screen of claim 5, wherein the intermediate layer has a shaded appearance.

10. The display screen of claim 8, wherein the intermediate layer has a generally black appearance.

11. The display screen of claim 8, wherein the backing structure includes a sheet of glass.

12. The display screen of claim 8, wherein the backing structure is transparent.

13. The display screen of claim 8, wherein the viewing surface layer only partially covers the backing layer.

14. The display screen of claim 8, wherein the viewing surface layer fully covers the backing layer.

* * * * *